G. CHRISTENSON.
PISTON PACKING.
APPLICATION FILED OCT. 6, 1919.

1,363,565.

Patented Dec. 28, 1920.

INVENTOR
George Christenson
BY
H. Parker Smith
ATTORNEY

UNITED STATES PATENT OFFICE.

GEORGE CHRISTENSON, OF NORTH PLAINFIELD, NEW JERSEY, ASSIGNOR TO H. W. JOHNS-MANVILLE COMPANY, A CORPORATION OF NEW YORK.

PISTON-PACKING.

1,363,565. Specification of Letters Patent. Patented Dec. 28, 1920.

Application filed October 6, 1919. Serial No. 328,817.

*To all whom it may concern:*

Be it known that I, GEORGE CHRISTENSON, a citizen of the United States of America, residing at North Plainfield, county of Somerset, State of New Jersey, have invented certain new and useful Improvements in Piston-Packings, of which the following is a specification.

My invention relates to packing rings for piston rods, plungers and the like, and is designed to produce a cheap but efficient packing having a flexible lip bearing on the piston rod, such as is shown in U. S. Patent to Trist, No. 885,405, dated April 21, 1908.

Said Trist patent discloses a packing of the general form shown in Fig. 3 of my present application but heretofore it has been made of asbestos cloth having wires interwoven with the asbestos threads, the cloth layers being saturated with rubber and vulcanized together after being pressed into shape. This has required a slow process of manufacture calling for much skill in the operator to properly build up the laminated mass, and the materials also are costly.

I have discovered that by making the whole, or at least the thicker, compression-resisting portions of the ring, of a tough and relatively solid composition originally plastic, the whole ring can be rapidly and cheaply molded and vulcanized in shape, producing (especially when given a slightly modified form) a cheap but most efficient packing having all the good qualities of the more costly structure of said Trist patent and some additional advantages.

The best form of embodiment of my invention at present known to me are illustrated in the accompanying sheet of drawings in which.

Figure 1:
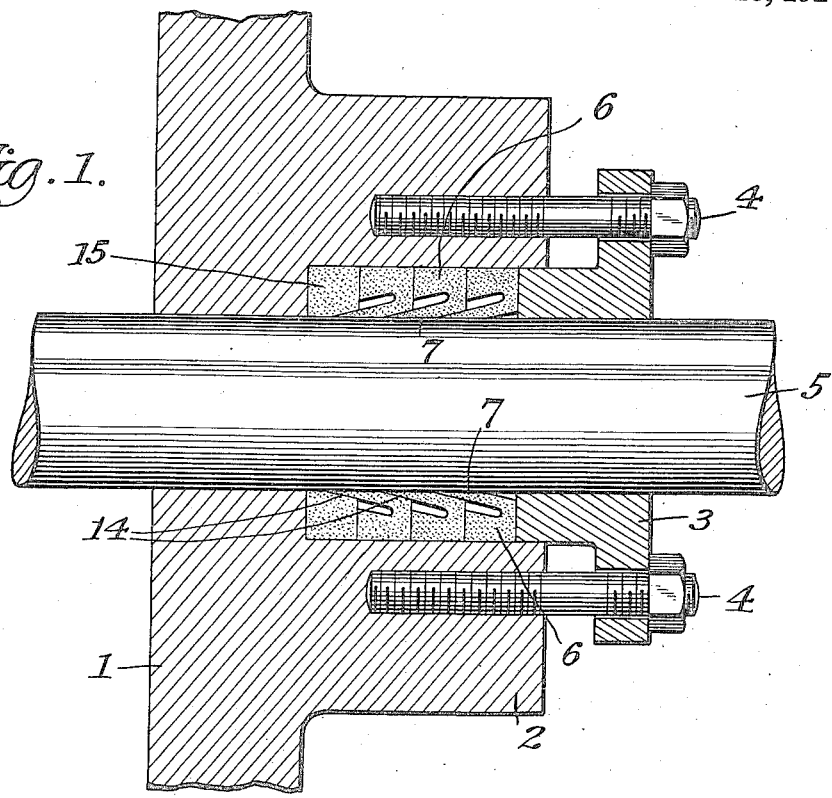
Figure 1 is a detail section of a stuffing box and piston rod with my invention applied, parts being broken away.

Throughout the drawings like reference characters indicate like parts. 1, is a cylinder head; 2, the stuffing box formed thereon; 3, the gland, and 4, 4, bolts holding the gland in position and putting any desired amount of compression on the packing rings in the stuffing box surrounding piston rod.

Figure 2:
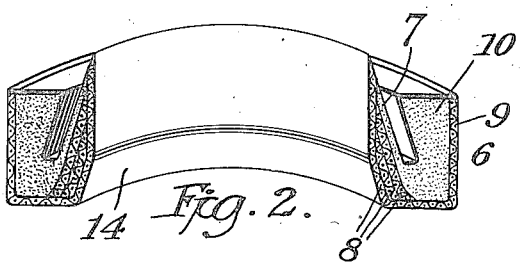
Fig. 2 is a perspective view on an enlarged scale of a portion of a modified form of ring.

As shown in Figs. 1 and 2, each ring is composed of an outer, compression-resisting portion 6, of sufficiently solid material and preferably of the substantially rectangular cross section therein illustrated, and an inner relatively flexible lip portion 7, of substantially tapering cross section. As shown in Fig. 1, both portions 6 and 7 are formed of a unitary, molded mass of tough material, such as the compound of finely divided sponge, rubber and asbestos described in my pending U. S. application, Serial No. 225,073 filed March 27, 1918. As shown in Fig. 2, the main portion of the compression-resisting part 6, is formed of the molded composition 10, as is also a minor portion of the lip 7. The rest of the ring is composed preferably of layers of convas or asbestos cloth 8, 8, which, however, require no wire interwoven therein. The outer layer of cloth 9, may pass under and up along the outer wall of the portion 6, of the ring, as shown in Fig. 2.

Figure 3:
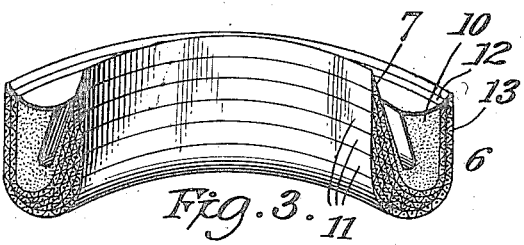
Fig. 3 is a similar view of another modification.

Fig. 3 shows my invention applied to the form of ring shown in the Trist patent except that the layers 11, forming the lip have their edges unprotected, all extending to and forming part of the inner wall of the lip 7. Here both the inner layer 12, and last or outer layer 13, are continued under and up around the outer wall of the compression-resisting portion 6, which is mainly formed of the before mentioned molded composition, as is also the inner surface of the lip portion.

The outlines of the cross section shown in Figs. 1 and 2 being rectilinear and the lip extending above the level of the compression-resisting portion, the base of each lip must be beveled off, as shown at 14, to leave a space for the end of the lip of the next ring when a plurality of the rings are nested together in a stuffing box, as shown in Fig. 1. To accommodate the projecting lip on the last ring of a series a solid filling ring or blank 15, is employed which has a rectangular cross section except for this beveled portion 14.

When the rings shown in Figs. 1 and 2 are placed in a stuffing box, as shown in Fig. 1, the thrust of the gland is taken up by the solid, rectilinear portions 6, which form a series of compression-resisting columns of the best possible shape for the purpose. They can not slide on or wedge into one another, or between one another and the stuffing box walls. This leaves the more flexible lip portion 7, free to slip idly over the piston rod surface during the outstroke and to be forced out against it, by pressure of the fluid confined in the cylinder, during the instroke thereof only, which is the underlying principle of operation sought to be perfected in packing of the type of the Trist patent.

In making the rings the materials are loosely assembled in a mold, compressed and vulcanized together. If fabric layers are used, as in Figs. 2 and 3, the wire threads formerly employed to give stiffness to the heel 6, of the rings are no longer needed. No particular skill is required in the operator in molding rings according to my invention and the fabric layers become firmly rooted in the heel, or section 6, after they have automatically adjusted themselves in the proper relative positions during the molding operation. The mass is then subjected to vulcanizing heat while in the mold and the parts are thereby fixed in the positions assumed to give the ring its desired shape.

The form of lip shown in Fig. 2 has the advantage that the continuous layer 9 creates less friction on the piston rod than do the edges of the several layers when arranged as in Fig. 3. The multiple sublips created by the several layers 11, of Fig. 3, however, would collectively form a tighter joint with the moving piston rod than does the form shown in Fig. 2.

Having described my invention, I claim:

1. A molded packing for piston rods and the like comprising a ring having an outer portion adapted to substantially fill the stuffing box and withstand compression thrusts of the gland, which portion is formed of a relatively solid, homogeneous molded mass, and an inner relatively flexible lip of tapering cross section, the thinner edge of said lip being in position to bear on the piston rod, while the thicker base thereof is rooted in the composition forming the first mentioned portion of the ring.

2. A packing ring such as set forth in claim 1 in which the lip portion is formed of layers of textile material.

3. A packing ring such as set forth in claim 1 in which the lip portion is formed of layers of textile material, the outer layer extending under, and up over the outer face of, the compression-resisting portion of the ring.

4. A packing ring such as set forth in claim 1 in which the compression-resisting portion is of substantially rectangular cross section.

GEORGE CHRISTENSON.